US009314998B2

(12) United States Patent
Labrot et al.

(10) Patent No.: US 9,314,998 B2
(45) Date of Patent: *Apr. 19, 2016

(54) COMPOSITE GLASS PANE AS A HEAD-UP DISPLAY

(75) Inventors: Michael Labrot, Aachen (DE); Atlal Laouar, Les Ulis (FR); Uwe Van Der Meulen, Nideggen (DE); Luz Rodriguez Gonzalez, Neuss (DE); Monique Elmer, Emsdetten (DE)

(73) Assignee: Saint-Gobain Glass France, Courbevoie (FR)

( * ) Notice: Subject to any disclaimer, the term of this patent is extended or adjusted under 35 U.S.C. 154(b) by 569 days.

This patent is subject to a terminal disclaimer.

(21) Appl. No.: 13/695,676

(22) PCT Filed: Jul. 8, 2011

(86) PCT No.: PCT/EP2011/061634
§ 371 (c)(1),
(2), (4) Date: Nov. 1, 2012

(87) PCT Pub. No.: WO2012/010444
PCT Pub. Date: Jan. 26, 2012

(65) Prior Publication Data
US 2013/0050983 A1 Feb. 28, 2013

(30) Foreign Application Priority Data

Jul. 23, 2010 (EP) .................... 10170560

(51) Int. Cl.
*B32B 17/10* (2006.01)
*B32B 37/14* (2006.01)
(Continued)

(52) U.S. Cl.
CPC ........... *B32B 17/10* (2013.01); *B32B 17/10036* (2013.01); *B32B 17/10339* (2013.01);
(Continued)

(58) Field of Classification Search
None
See application file for complete search history.

(56) References Cited

U.S. PATENT DOCUMENTS 6,094,981 A * 8/2000 Hochstein .................. 73/170.17
8,487,277 B2 * 7/2013 Labrot et al. ............... 250/461.1
(Continued)

FOREIGN PATENT DOCUMENTS

DE 25 20 642 11/1976
FR 2 914 070 9/2008
(Continued)

OTHER PUBLICATIONS
International Search Report Issued Oct. 28, 2011 in PCT/EP11/61634 Filed Jul. 8, 2011.

*Primary Examiner* — Cheng Huang
(74) *Attorney, Agent, or Firm* — Oblon, McClelland, Maier & Neustadt, L.L.P.

(57) ABSTRACT

Composite glass pane comprising at least
a. one inner pane (1),
b. one outer pane (2), and
c. one intermediate layer (3) between the inner pane (1) and the outer pane (2), wherein the intermediate layer (3) contains at least one first thermoplastic film (3b) with a first luminescent pigment (3a), a second thermoplastic film (3d), and a barrier film (3c) between the thermoplastic films (3b, 3d) and wherein the luminescent pigment (3a) contains a hydroxyalkyl terephthalate having the formula: $R_1$—COO—P(OH)x(0-4)-COO—$R_2$, where $R_1$, $R_2$ is an alkyl or allyl residue having 1 to 10 C atoms, P is a phenyl ring, OH is hydroxyl groups bonded to the phenyl ring, and x is the number of hydroxyl groups bonded to the phenyl ring.

20 Claims, 6 Drawing Sheets

(51) Int. Cl.
*F21V 9/16* (2006.01)
*G02B 27/14* (2006.01)
*B32B 27/36* (2006.01)
*B32B 27/30* (2006.01)
*G02B 27/01* (2006.01)
*C08K 5/00* (2006.01)
*C08K 5/134* (2006.01)
*C08K 3/00* (2006.01)

(52) U.S. Cl.
CPC ..... *B32B17/10669* (2013.01); *B32B 17/10761* (2013.01); *C08K 5/0041* (2013.01); *C08K 5/1345* (2013.01); *G02B 27/01* (2013.01); *C08K 3/0033* (2013.01); *G02B 2027/0112* (2013.01); *G02B 2027/0118* (2013.01); *Y10T 428/24967* (2015.01); *Y10T 428/269* (2015.01); *Y10T 428/3154* (2015.04); *Y10T 428/31507* (2015.04); *Y10T 428/31616* (2015.04)

(56) References Cited

U.S. PATENT DOCUMENTS

| | | |
|---|---|---|
| 2002/0076550 A1* | 6/2002 | Kohla et al. .................... 428/332 |
| 2002/0120916 A1 | 8/2002 | Snider, Jr. |
| 2004/0070551 A1 | 4/2004 | Walck et al. |
| 2006/0171007 A1 | 8/2006 | Chen et al. |
| 2009/0277671 A1* | 11/2009 | Hahn ........................... 174/257 |
| 2011/0073773 A1 | 3/2011 | Labrot et al. |
| 2012/0068083 A1 | 3/2012 | Labrot et al. |

FOREIGN PATENT DOCUMENTS

| | | |
|---|---|---|
| FR | 2 929 017 | 9/2009 |
| GB | 844 540 | 8/1960 |
| WO | WO 2010139889 A1 * | 12/2010 |

\* cited by examiner

PRIOR ART

COMPOSITE GLASS PANE AS A HEAD-UP DISPLAY

The invention relates to a composite glass pane, a method for producing the composite glass pane, and its use as a head-up display.

Head-up displays (HUDs) are widespread in aviation. The systems mounted in the direct field of vision of pilots display the most important information about their own and other aircrafts. These systems, established and much used in the military sector, also have many possibilities for use in the civil sector, in particular in the automobile sector. Thus, data about the speed, the distance from the preceding vehicle or directional data from the navigation equipment can, in contrast to head-down displays (HDDs), be displayed right at the eye level of the driver. These capabilities clearly improve the traffic safety of the vehicle as the driver cannot watch the traffic situation while looking at the instruments. With increased speeds of the motor vehicle, on freeways, for example, the distance traveled "blind" by the vehicle can be significant and can cause an increased accident risk.

If head-up displays (HUDs) are illuminated by an external light source, such as a laser, the light fields can be seen only with difficulty depending on the prevailing light and weather conditions. Strong sunlight and light reflection through drops of water make seeing the data projected in the head-up display significantly more difficult. This is particularly clearly evident with virtual images that are projected onto the display area, for example, the front window. Real images generated on the display area by electromagnetically excited dyes or pigments constitute a possible approach to a solution.

Because of the size of the pane and the tendency of the pigments to distribute themselves uniformly in the intermediate layer, relatively high concentrations of the chromophoric pigments are necessary. The treatment of the composite glass pane in the autoclave intensifies this effect. However, in many cases high pigment concentrations are very expensive and sometimes require special precautionary measures in light of the regulatory classification and handling of pigments or dyes as hazardous substances.

DE 603 14 613 T2 discloses a photochromic composition and a method for its production. The composition contains a linear, cross-linkable polyurethane or polyurethane-urea polymer and a photochromic organic compound.

WO 2004/099172 A1 discloses a photochromic composition on a benzo-, naphtho-, and phenathrochromic structure substituted with an arylamine group.

U.S. Pat. No. 7,230,767 B2 discloses an image display system in a motor vehicle window pane. The arrangement contains luminescent compounds on the outward facing side of the inner pane. The luminescent compounds are illuminated by a light source and appear in the field of vision of an automobile driver.

The object of the invention is to provide a composite glass pane that can be used as a head-up display and enables good recognizability as well as high luminosity in one or a plurality of colors under all light conditions even with low pigment or dye concentrations.

The object of the present invention is accomplished according to the invention by means of the independent claim 1. Preferred embodiments emerge from the subclaims.

A method according to the invention for producing a composite glass pane with head-up display, a device, and their use emerge from other coordinated claims.

The composite glass pane according to the invention comprises at least one inner pane, one outer pane, and at least one polymer intermediate layer. The expression "outer pane" refers to the pane situated on the outside; the expression "inner pane" refers to the pane located in vehicle interior or facing inward. The panes preferably contain flat glass (float glass), quartz glass, borosilicate glass, soda lime glass. The panes preferably have average light transmission (unless otherwise specified as light transmission for light type A and a 2°-standard observer according to DIN 5033 for light of the wavelengths from 380 nm to 780 nm) of more than 80%, preferably more than 90%. The panes preferably have light transmission of >70%, particularly preferably 75% in the wavelength range from 360 nm to 420 nm.

The intermediate layer contains at least a first luminescent pigment and preferably a first thermoplastic film, a barrier film, and a second thermoplastic film. The thermoplastic film preferably contains PVB (polyvinyl butyral) or EVA (polyethyl-vinyl acetate). The luminescent first pigments are preferably contained in the entire first thermoplastic film volume. The barrier film acts as a diffusion barrier for the luminescent pigments. The barrier film preferably contains a maximum of less than 10% and particularly preferably less than 5% of the residual concentration or "impurity" of luminescent pigment compared to the pigment-containing thermoplastic film.

The luminescent pigment contains a hydroxyalkyl terephthalate having the formula: $R_1$—COO—P(OH)x(0-4)-COO—$R_2$, where $R_1$, $R_2$ is an alkyl or allyl residue having 1 to 10 C atoms, P is a phenyl ring, OH is hydroxyl groups bonded to the phenyl ring, and x is the number of hydroxyl groups bonded to the phenyl ring. The general structural formula is:

The luminescent pigment preferably contains diethyl 2,5-dihydroxyterephtalate. The structural formula is:

The luminescent pigments can, in the context of the invention, contain other organic and/or inorganic luminescent compounds, ions, aggregates, and/or molecules. Luminescence includes fluorescence and/or phosphorescence processes, excitation with electromagnetic radiation, and emission of electromagnetic radiation. The radiation emitted preferably has a different wavelength from the exciting radiation. The radiation emitted preferably has a higher wavelength. The barrier film disposed between the first thermoplastic film and the second thermoplastic film prevents or reduces the diffusion of luminescent pigments into the second thermoplastic film. The first thermoplastic film and other thermoplastic films preferably have light transmission of >70%, particularly preferably >82%, measured at a wavelength of 405 nm. The light transmission of the thermoplastic films can be set by film thickness, polymer composition, degree of polymerization, distribution of polymerization, UV blockers, or plasticizers. The thermoplastic films according to the invention enable only a slight weakening of the exciting and emitted electromagnetic radiation and, thus, high luminosity of the head-up display. The first thermoplastic film is preferably disposed adjacent the inner pane; the second thermoplastic film is preferably disposed adjacent the outer pane.

The barrier film preferably contains polybutylene terephthalate (PBT), polycarbonate (PC), polyethylene terephthalate (PET), and polyethylene naphthalate (PEN), polyvinyl chloride (PVC), polyvinyl fluoride (PVF), polyvinyl butyral (PVB) without plasticizer, and/or copolymers thereof, particularly preferably polyethylene terephthalate (PET).

The thermoplastic film preferably has light transmission of >50%, preferably >60%, particularly preferably >70%, measured at a wavelength of 375 nm.

The thermoplastic film preferably has light transmission of >75%, preferably >82%, in the wavelength range from 390 nm to 410 nm.

The intermediate layer preferably contains PVC (polyvinyl chloride), PU (polyurethane), EVA (poly-ethyl vinyl acetate), and mixtures as well as copolymers thereof.

The second thermoplastic film preferably contains a second luminescent pigment or dye. The second luminescent pigment preferably emits light of a different wavelength from the first luminescent pigment. Alternatively, further thermoplastic films with luminescent pigments and barrier films lying therebetween can be disposed.

The barrier film preferably contains a third luminescent pigment. In a particularly preferred embodiment, the first thermoplastic film, the barrier film, and the second thermoplastic film include three different luminescent pigments.

The intermediate layer preferably contains no other UV blockers active in the range of the excitation spectrum of the fluorescent particles between 360 nm and 400 nm. The luminescent pigments according to the invention preferably act as UV blockers.

The luminescent pigment preferably has a local excitation maximum in the range from 350 nm to 450 nm, particularly preferably 390 nm to 420 nm. Good results are obtained in this range.

The luminescent pigment preferably has a local emission maximum in the range from 400 nm to 800 nm, particularly preferably 430 nm to 500 nm.

The intermediate layer preferably has a thickness of 0.30 mm to 0.9 mm, preferably 0.50 mm to 0.80 mm.

The luminescent pigments preferably contain benzopyranes, naphthopyranes, 2H-naphthopyranes, 3H-naphthopyranes, 2H-phenanthropyranes, 3H-phenanthropyranes, photochromic resins, coumarins, xanthines, naphthalic acid derivatives, oxazoles, stilbenes, styryls, perylenes, naphthalimides, naphthals, phenyls, xanthenes, lanthanides, preferably $Y_2O_3$:Eu, $YVO_4$:Tm, $Y_2O_2S$:Pr, $Gd_2O_2S$:Tb, and/or mixtures thereof.

The luminescent pigments preferably additionally contain, as solvents, alcohols, ketones, esters, amines, amides, and/or mixtures thereof. The luminescent pigment particularly preferably additionally contains ethanol, tetrahydrofuran, and/or benzyl alcohol. Most of the solvents are lost to evaporation after application of the luminescent pigments.

The intermediate layer preferably contains 0.1 g/m$^2$ to 15 g/m$^2$ of luminescent pigment. The quantity indications are based on a thickness of the intermediate layer of roughly 0.76 mm.

The inner pane and/or outer pane preferably have a thickness of 1 mm to 4 mm, particularly preferably 1.4 mm to 2.5 mm. The inner pane and the outer pane can have different thicknesses.

The inner pane and/or outer pane preferably have tinting and/or coating. The tinting and/or coating can intensify the contrast of the projected image and protect the luminescent pigments from aging. The outer, outward facing pane preferably contains tinting and/or coating; and the inner pane, facing the light source in the vehicle interior, contains no tinting and/or coating.

The barrier film preferably has a coating, preferably a metallic coating, particularly preferably, ZnO, Ag, $In_2O_3$, $TiO_2$, AlN. The coating intensifies the action of the barrier film as a diffusion barrier for the luminescent pigments or dyes. The coating is preferably disposed on the barrier film adjacent the thermoplastic film with the luminescent pigment or dye.

The invention further comprises a device for displaying a pictogram, numbers, and graphic characters. The device comprises a composite glass pane as described above and a light source aimed at the composite glass pane. The light source emits electromagnetic radiation, preferably electromagnetic radiation of the wavelength of 360 nm to 420 nm. The radiation emitted by the light source is absorbed by the luminescent pigments in the intermediate layer and is re-emitted with a changed wavelength. This emitted radiation is perceived by the viewer as a pixel on the pane. The light source preferably comprises a diode laser.

The invention further comprises a method for producing a composite glass pane. The method comprises, in a first step, the application of a first luminescent pigment on a first thermoplastic film, which, in the following step, is laminated between an inner pane as well as a barrier film, a second thermoplastic film, and an outer pane. The lamination preferably occurs at temperatures from 120° C. to 170° C., a pressure of 10 bar to 15 bar, and for a period of 30 min to 240 min. During lamination, the first luminescent pigments are preferably distributed uniformly in the entire thermoplastic film and only slightly in the barrier film. After lamination, the barrier film preferably contains less than 10%, particularly preferably less than 5% of the concentration of a first luminescent pigment in the thermoplastic film.

The luminescent pigment is preferably applied by spraying, screen printing, offset printing, ink jet printing, and/or flexographic printing.

The invention further comprises the use of the composite glass pane as transparent or semi-transparent display systems, head-up display in buildings, motor vehicles, airplanes, and/or helicopters, particularly preferably as windshields in motor vehicles.

In the following, the invention is explained in detail with reference to the drawings and an exemplary embodiment as well as a comparative example. The drawings are purely schematic representations and are not to scale. They in no way restrict the invention.

They depict:

Figure 1:
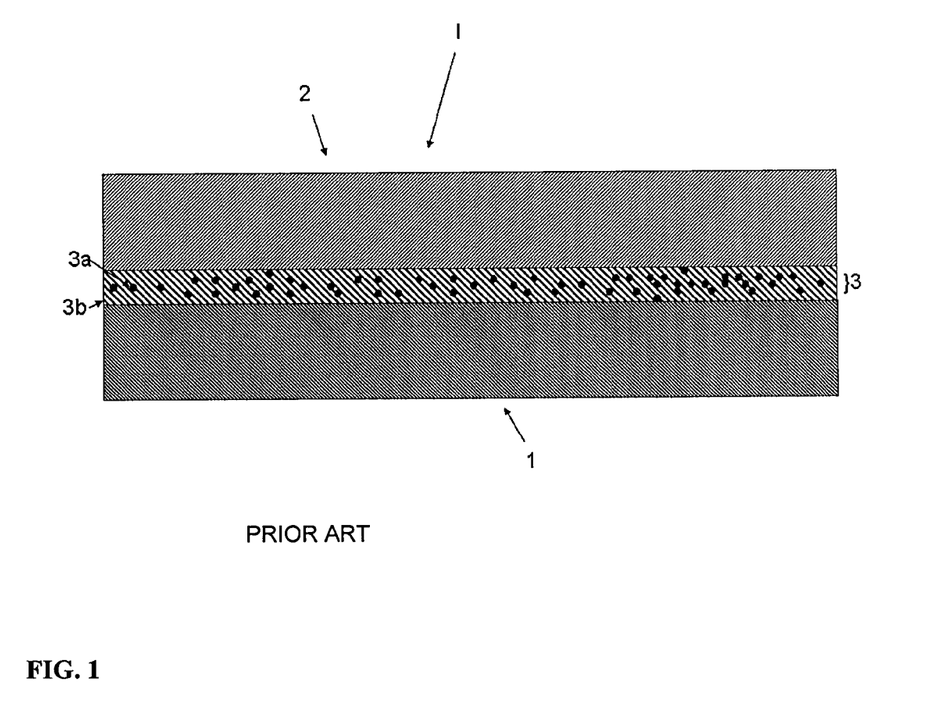
FIG. 1 a cross-section of a composite glass pane with luminescent particles according to the prior art, FIG. 2 a cross-section of a composite glass pane according to the invention, FIG. 3 a cross-section of the intermediate layer according to the invention, FIG. 4 a cross-section of a preferred embodiment of the intermediate layer according to the invention, FIG. 5 a cross-section of another preferred embodiment of the intermediate layer according to the invention, and FIG. 6 a schematic view of the device according to the invention.

FIG. 1 depicts a cross-section of a composite glass pane (I) with luminescent particles (3a) according to the prior art. The composite glass pane (I) comprises at least one inner pane (1), one outer pane (2), and at least one polymer intermediate layer (3). The expression "outer pane" refers to the pane situated on the outside; the expression "inner pane" refers to the pane of the composite glass pane (I, II) located in the vehicle interior. The intermediate layer (3) comprises a thermoplastic film (3b) made of PVB and luminescent pigments or dyes (3a), which are statistically distributed in the thermoplastic film (3b) after lamination of the composite glass pane (I). The broad distribution of the pigments (3a) in the thermoplastic film (3b) makes a high pigment concentration necessary, since luminosity is adequately high only with high pigment density (3a).

Figure 2:
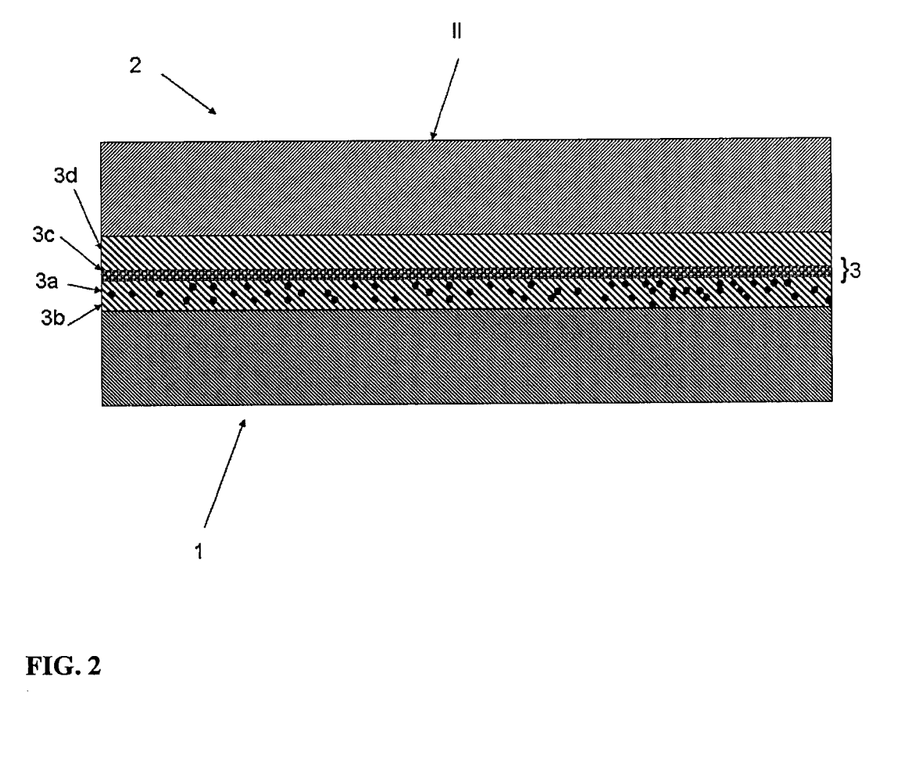

FIG. 2 depicts a cross-section of a composite glass pane (II) according to the invention. The composite glass pane (II) comprises at least one inner pane (1), one outer pane (2), and at least one polymer intermediate layer (3). The intermediate layer (3) comprises a first thermoplastic film (3b) made of PVB and luminescent pigments (3a) distributed in the thermoplastic film (3b). Following the first thermoplastic film (3b) is a barrier film (3c) made of PET, which is virtually free of luminescent pigments or dyes (3a) even after lamination of the composite glass pane. The expression "virtually free" means, in the context of the invention, no excitation or emission of electromagnetic radiation in the barrier film (3c) discernible to the naked eye. A second thermoplastic film (3d) made of PVB is bonded to the barrier film (3c) and the outer pane (2). Even after 4 weeks storage at 90° C. with excitation by a laser of the wavelength 365 nm, the composite glass pane (II) presented no visible emission from the outer pane (2). When the excitation occurs with a laser of the wavelength 365 nm through the inner pane (1), the composite glass pane (II) presents clear emission of light in the visible range. This demonstrates that no visible portions of luminescent pigment (3a) are contained in the barrier film (3c). If luminescent pigments (3a) had diffused into the barrier film (3c), emitted radiation would have to appear at the interface between the second thermoplastic film (3d) and the barrier film (3c). In the remaining barrier film (3c) and first thermoplastic film (3b) no emission is present because of the UV absorption of these films.

Figure 3:
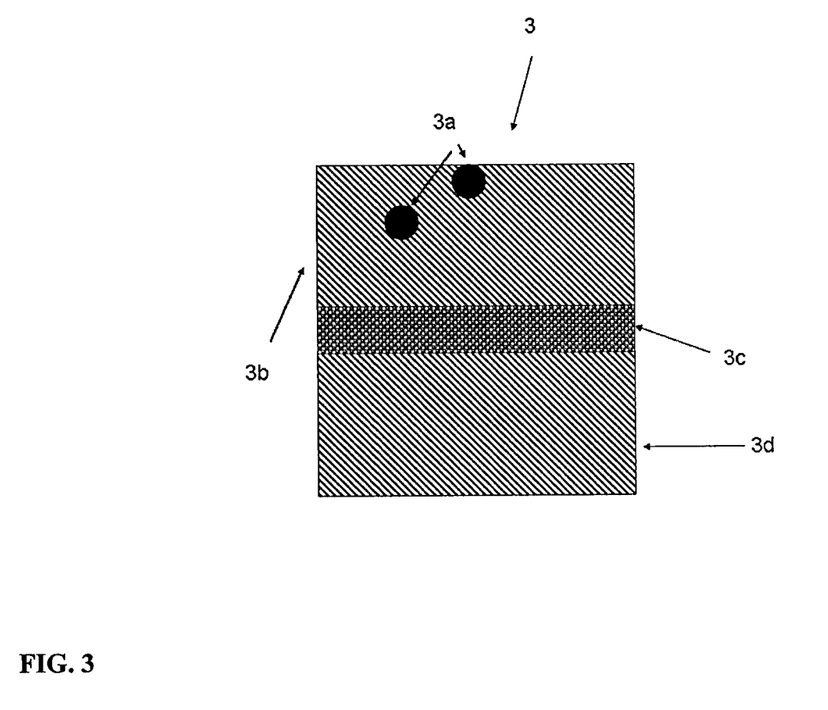

FIG. 3 depicts an enlarged cross-section of the intermediate layer (3) according to the invention made of a first thermoplastic film (3b) with first luminescent particles (3a) as well as the barrier film (3c) and second thermoplastic film (3d) following the first thermoplastic film (3b).

Figure 4:
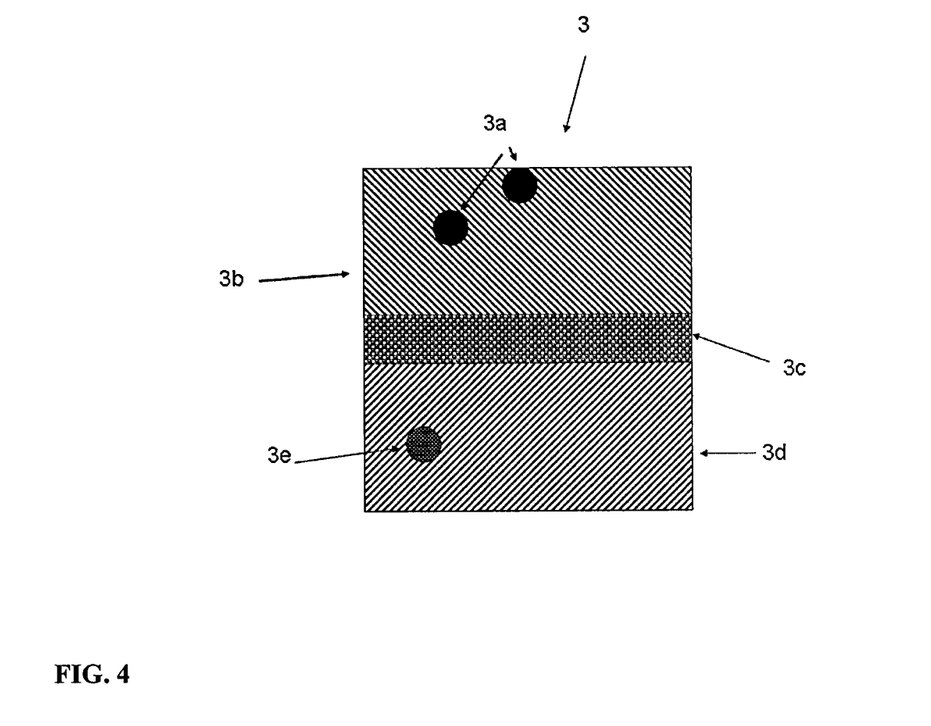

FIG. 4 depicts an enlarged cross-section of a preferred embodiment of the intermediate layer (3) according to the invention made of a first thermoplastic film (3b) with luminescent particles (3a) and the barrier film (3c) following the first thermoplastic film (3b). A second thermoplastic film (3d) follows the barrier film (3c). The second thermoplastic film (3d) can contain a further luminescent pigment or dye (3e). The combination of the luminescent pigments (3a) and (3e) enables the generation of additional color effects.

Figure 5:
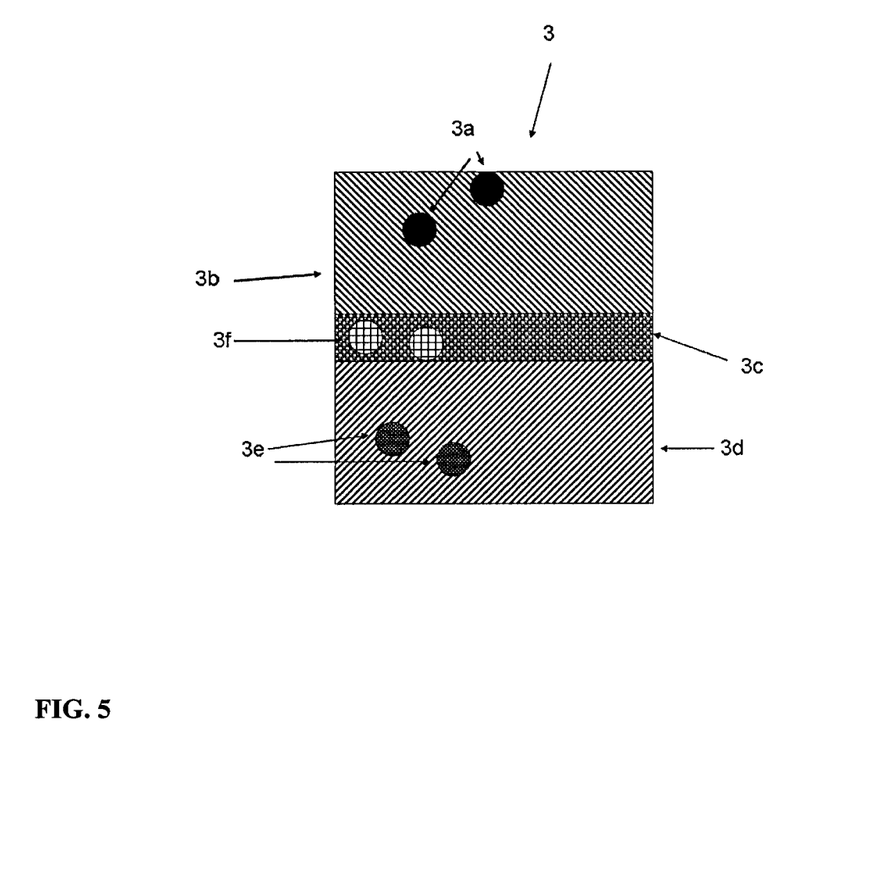

FIG. 5 depicts another enlarged cross-section of a preferred embodiment of the intermediate layer (3) according to the invention made of a first thermoplastic film (3b) with first luminescent particles (3a), barrier film (3c), and another second thermoplastic film (3d). The second thermoplastic film (3d) contains a second luminescent pigment or dye (3e), and the barrier film (3c) contains a third luminescent pigment (3f).

Figure 6:
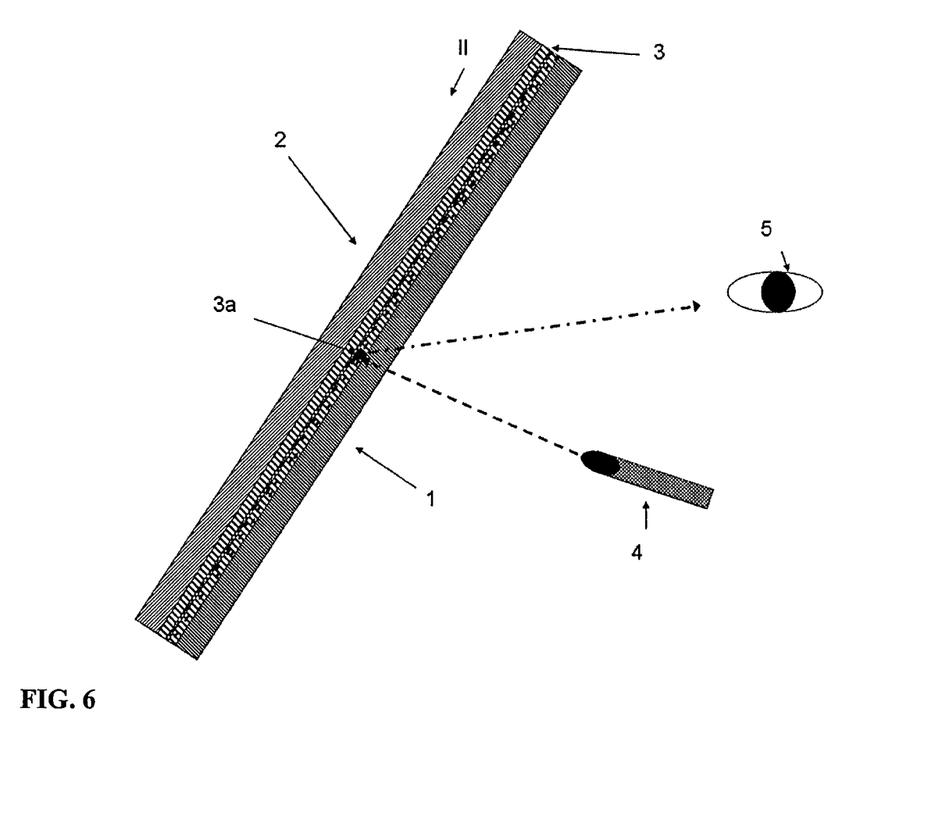

FIG. 6 depicts a cross-section of the device according to the invention. The composite glass pane (II) made of an inner pane (1), intermediate layer (3), and outer pane (2) is illuminated by a light source (4), preferably a diode laser. The luminescent pigments (3a) situated in the intermediate layer (3) emit light that is perceived by the viewer as an image, signal, or pictogram.

LIST OF REFERENCE CHARACTERS (1) inner pane,
(2) outer pane,
(3) intermediate layer,
(3a) first luminescent pigment or dye,
(3b) first thermoplastic film,
(3c) barrier film,
(3d) second thermoplastic film,
(3e) second luminescent pigment or dye,
(3f) third luminescent pigment or dye,
(4) light source, and
(5) viewer.

The invention claimed is:

1. A composite glass pane, comprising:
   a. an inner pane;
   b. an outer pane; and
   c. an intermediate layer between the inner pane and the outer pane,
   wherein the intermediate layer comprises a first thermoplastic film comprising a first luminescent pigment, a second thermoplastic film, and a barrier film between the first and second thermoplastic films, and
   wherein the first luminescent pigment comprises a hydroxyalkyl terephthalate of formula:

$R_1$—COO—P(OH)$x$(0-4)-COO—$R_2$, wherein:
   $R_1$ and $R_2$ are each independently an alkyl or allyl residue comprising 1 to 10 C atoms;
   P is a phenyl ring;
   OH is a hydroxyl group bonded to the phenyl ring; and
   x is the number of hydroxyl groups bonded to the phenyl ring.

2. The composite glass pane of claim 1, wherein the second thermoplastic film comprises a second luminescent pigment.

3. The composite glass pane of claim 2, wherein the barrier film comprises a third luminescent pigment.

4. The composite glass pane of claim 3, wherein the first, second, or third luminescent pigment has an excitation maximum in the range from 350 nm to 450 nm and/or an emission maximum in the range from 400 nm to 800 nm.

5. The composite glass pane of claim 4, wherein the first, second, or third luminescent pigment has an excitation maximum in the range from 390 nm to 420 nm, and/or an emission maximum in the range from 430 nm to 500 nm.

6. The composite glass pane of claim 3, wherein the first, second, and third luminescent pigments comprise a benzopyrane, a naphthopyrane, a 2H-naphthopyrane, a 3H-naphthopyrane, a 2H-phenanthropyrane, a 3H-phenanthropyrane, a photochromic resin, a coumarin, a xanthine, a naphthalic acid derivative, an oxazole, a stilbene, a styryl, a perylene, a lanthanide, or any mixture thereof.

7. The composite glass pane of claim 3, wherein the first, second, and third luminescent pigments comprise an alcohol, a ketone, an ester, an amine, an amide, or any mixture thereof.

8. The composite glass pane of claim 7, wherein the first, second, and third luminescent pigments comprise ethanol, tetrahydrofuran, benzyl alcohol, or any mixture thereof.

9. The composite glass pane of claim 1, wherein the barrier film comprises polybutylene terephthalate (PBT), polycarbonate (PC), polyethylene terephthalate (PET), and polyethylene naphthalate (PEN), polyvinyl chloride (PVC), polyvinyl fluoride (PVF), polyvinyl butyral (PVB) without plasticizer, or any mixture or any copolymer thereof.

10. The composite glass pane of claim 9, wherein the barrier film comprises polyethylene terephthalate (PET).

11. The composite glass pane of claim 1, wherein the intermediate layer has a thickness of 0.30 mm to 0.9 mm.

12. The composite glass pane of claim 11, wherein the intermediate layer has a thickness of 0.50 mm to 0.80 mm.

13. The composite glass pane of claim 1, wherein the first luminescent pigment comprises diethyl 2,5-dihydroxyterephtalate.

14. The composite glass pane of claim 1, wherein the inner pane and/or outer pane have a thickness of 1 mm to 4 mm.

15. The composite glass pane of claim 14, wherein the inner pane and/or outer pane have a thickness of 1.4 mm to 2.5 mm.

16. The composite glass pane of claim 1, wherein the barrier film comprises a coating.

17. A device comprising the composite glass pane of claim 1; and
a light source, which is aimed at the composite glass pane,
wherein the light source emits electromagnetic radiation onto the composite glass pane.

18. The device of claim 17, wherein the light source comprises a laser.

19. A method for producing the composite glass pane of claim 1, the method comprising:
a. applying the first luminescent pigment on the first thermoplastic film; and
b. placing and laminating the first luminescent pigment on the first thermoplastic film between the inner pane and the barrier film, the second thermoplastic film, and the outer pane.

20. A head-up display, comprising the composite glass pane of claim 1.

* * * * *